United States Patent [19]

Senga

[11] Patent Number: 5,093,469

[45] Date of Patent: Mar. 3, 1992

[54] PROCESS FOR PREPARING POLYARYLENE SULFIDES WITH SODIUM HYDROSULFIDE

[75] Inventor: Minoru Senga, Sodegaura, Japan

[73] Assignee: Idemitsu Petrochemical Company Limited, Tokyo, Japan

[21] Appl. No.: 400,915

[22] Filed: Aug. 30, 1989

[30] Foreign Application Priority Data

Aug. 31, 1988 [JP] Japan ............................ 63-217733

[51] Int. Cl.$^5$ .............................................. C08G 75/16
[52] U.S. Cl. ..................................... 528/388; 528/86; 528/210; 528/391
[58] Field of Search ................. 528/388, 86, 210, 391

[56] References Cited

U.S. PATENT DOCUMENTS 3,867,356  2/1975  Campbell.
4,038,263  7/1977  Edmonds, Jr. et al..
4,451,643  5/1984  Edmonds, Jr. et al..
4,837,301  6/1989  Glock et al. ...................... 528/388

FOREIGN PATENT DOCUMENTS 0039508  11/1981  European Pat. Off..
0171021   2/1986  European Pat. Off..
0355543   2/1990  European Pat. Off..

Primary Examiner—Harold D. Anderson
Attorney, Agent, or Firm—Armstrong, Nikaido, Marmelstein, Kubovcik & Murray

[57] ABSTRACT

Polyarylene sulfides are prepared by reacting a dihalogen aromatic compound with a sodium hydrosulfide in the presence of an alkali metal aminoalkanoate and a lithium halide in an organic polar solvent. This process can prevent a decomposition of the sodium hydrosulfide during dehydration and produce the polyarylene sulfides in a granular form in high yields and with high efficiency.

The polyarylene sulfides obtainable by this process are high in molecular weight and degree of whiteness and low in a content of salts remaining therein. Furthermore, the polyarylene sulfides are in the granular form so that they can be handled with ease because of their readily separability and washability.

17 Claims, No Drawings

PROCESS FOR PREPARING POLYARYLENE SULFIDES WITH SODIUM HYDROSULFIDE

BACKGROUND OF THE INVENTION

1. Field of the Invention

The present invention relates to a process for preparing a polyarylene sulfide and, more particularly, to a process for preparing a granular polyarylene sulfide with a high yield and with efficiency while preventing a source of sulfur from decomposing during dehydration, a polyarylene sulfide having a high molecular weight and a high degree of whiteness and containing a salt within the polyarylene sulfide product in a lesser amount. The polyarylate sulfide is suitable for molding materials for various molded articles, films, sheets, and for varous injection moldings including mechanical, electric and electronic parts as well as IC sealants.

2. Description of Related Art

Polyarylene sulfides such as polyphenylene sulfides are thermoplastic while being partially thermosetting, and they have superior properties as engineering plastics, such as excellent resistance to chemicals, high mechanical strength over a broad temperature range, and good thermal rigidity.

Various processes for preparing polyarylene sulfides such as polyphenylene sulfides have been heretofore proposed.

For instance, U.S. Pat. No. 3,867,356 discloses a process in which a polyhalogen aromatic compound is reacted with an alkali metal hydrosulfide in an organic amide compound as a solvent in the presence of an alkali metal aminoalkanoate. This process, however, presents the problems that the resulting polyarylene sulfide has a low molecular weight and it is colored due to by-products produced by the side reactions between the polyhalogen aromatic compound and the alkali metal aminoalkanoate, thereby yielding no polyarylene sulfides with a high degree of whiteness.

U.S. Pat. No. 4,038,263 discloses a process in which a lithium halide is used as a catalyst in the reaction of p-dichlorobenzene with an alkali metal sulfide. This process, however, causes the alkali metal sulfide as a sulfur source to be decomposed during dehydration leading to lessening a production efficiency so that this process is industrially disadvantageous. The resulting polyphenylene sulfide is so colored that the product with a high degree of whiteness cannot be prepared. And the resulting product contains a relatively large amount of remaining salts. Furthermore, this process produces polymers in a yield as low as 70 to 85% so that improvements in yields have been demanded.

SUMMARY OF THE INVENTION

Therefore, the present invention has the object to provide a process for preparing a granular polyarylene sulfide with a high yield and with efficiency while preventing a source of sulfur from decomposing during dehydration, a polyarylene sulfide having a high molecular weight and a high degree of whiteness and containing a lesser amount of salts remaining in the polymers.

As a result of extensive research and studies, it have been found that a reaction of a dihalogen aromatic compound with an alkali metal hydrosulfide in the presence of specified metal alkanoate and alkali metal halide in a solvent can yield a granular polyarylene sulfide high in molecular weight and whiteness and low in a salt content with a high yield and with high efficiency while preventing the source of sulfur from decomposing during dehydration.

In order to achieve the object, the present invention consists of reacting a dihalogen aromatic compound with sodium hydrosulfide in the presence of an alkali metal aminoalkanoate and a lithium halide in an organic polar solvent.

DESCRIPTION OF THE PREFERRED EMBODIMENTS

The dihalogen aromatic compound to be used for the process according to the present invention may be any conventional one having two halogen atoms and may include, for example, a dihalobenzene such as m-dihalobenzene and p-dihalobenzene; an alkyl-substituted dihalobenzene such as 2,3-dihalotoluene, 2,5-dihalotoluene, 2,6-dihalotoluene, 3,4-dihalotoluene, 2,5-dihaloxylene, 1-ethyl-2,5-dihalobenzene, 1,2,4,5-tetramethyl-3,6-dihalobenzene and 1-n-hexyl-2,5-dihalobenzene; a cycloalkyl-substituted dihalobenzene such as 1-cyclohexyl-2,5-dihalobenzene; an arylsubstituted dihalobenzene such as 1-phenyl-2,5-dihalobenzene, 1-benzyl-2,5-dihalobenzene and 1-p-toluyl-2,5-dihalobenzene; a dihalobiphenyl such as 4,4'-dihalobiphenyl; and a dihalonaphthalene such as 1,4-dihalonaphthalene, 1,6-dihalonaphthalene, and 2,6-dihalonaphthalene. The two halogen atoms in the dihalogen aromatic cmpounds may be the same or different from each other and may be, for example, fluorine, chlorine, bromine or iodine. Dihalobenzenes are preferred, and p-dichlorobenzene and p-dichlorobenzene containing 20 mol % or lower of m-dichlorobenzene are particularly preferred.

The sodium hydrosulfide to be used as a sulfur source for the production of the polyarylene sulfide according to the present invention may be in the form of an anhydride, a hydrate or an aqueous solution. When it is used in the form of the hydrate or aqueous solution, it is dehydrated prior to polymerization in a manner as will be described hereinafter.

The alkali metal aminoalkanoate to be used as an acid seizing agent in accordance with the present invention may be represented by the following general formula:

(wherein

R₁, R₂, R₃ and R₄ are identical to or different from each other and are each a hydrogen atom, an alkyl group having from 1 to 12 carbon atoms, a cycloalkyl group having from 3 to 12 carbon atoms, or an aryl group;

M is an alkali metal; and n is an integer of 1 to 12; provided, and the total number of carbon atoms is from 2 to 24).

The alkali metal represented by the symbol M in the above formula may include, for example, lithium, sodium, potassium, rubidium or cesium. Lithium and sodium are preferred, and sodium is more preferred.

The alkali metal aminoalkanoate as represented by the above general formula may include, for example, lithium N-methyl aminobutyrate, sodium N-methyl aminobutyrate, potassium N-methyl aminobutyrate, rubidium N-methyl aminobutyrate, cesium N-methyl aminobutyrate, lithium N-methyl aminovalerate, sodium N-methyl aminovalerate, potassium N-methyl aminovalerate, rubidium N-methyl aminovalerate, cesium N-methyl aminovalerate, lithium N-methyl aminocaproate, sodium N-methyl aminocaproate, potassium N-methyl aminocaproate, rubidium N-methyl aminocaproate, and cesium N-methyl aminocaproate. The alkali metal salt of N-methyl aminobutyric acid is preferred and sodium N-methyl aminobutyrate is more preferred. The alkali metal aminoalkanoate may be used singly or in combination thereof. The alkali metal aminoalkanoate may be used in the form of an anhydride, a hydrate or an aqueous solution, like the sodium hydrosulfide. When it is used in the form of a hydrate or an aqueous solution, it is dehydrated prior to polymerization in the manner as will be described hereinbelow.

The lithium halide to be used may be preferably lithium fluoride, lithium chloride, lithium bromide and lithium iodide, and lithium chloride is more preferred. The lithium halide may be used singly or in combination thereof. The lithium halide may be used in the form of an anhydride, a hydrate or an aqueous solution, like the sodium hydrosulfide and the alkali metal aminoalkanoate. The lithium halide in the form of a hydrate or an aqueous solution may be usually used after dehydration to be carried out prior to polymerization, as will be described hereinafter.

As the organic polar solvent may be used a non-protonic organic polar solvent such as an organic amide compound, a lactam compound, a urea compound, and a cyclic organophosphorus compound.

The amide compound may include, for example, a formamide such as N,N-dimethylformamide, an acetamide such as N,N-dimethylacetamide, N,N-diethylacetamide and N,N-dipropylacetamide, and an aromatic carboxylic amide such as N,N-dimethylbenzoic amide, and the like.

The lactam compound may include, for example, a caprolactam such as caprolactam, N-methylcaprolactam, N-ethylcaprolactam, N-n-propylcaprolactam, N-isopropylcaprolactam, N-n-butylcaprolactam, N-isobutylcaprolactam and N-cylcohexylcaprolactam, a pyrrolidone such as N-methyl-2-pyrrolidone, N-ethyl-2-pyrrolidone, N-n-propyl-2-pyrrolidone, N-isopropyl-2-pyrrolidone, N-n-butyl-2-pyrrolidone, N-isobutyl-2-pyrrolidone, N-cyclohexyl-2-pyrrolidone, N-methyl-3-methyl-2-pyrrolidone, N-ethyl-3-methyl-2-pyrrolidone and N-methyl-3,4,5-trimethyl-2-pyrrolidone, a piperidone such as N-methyl-2-piperidone, N-ethyl-2-piperidone, N-propyl-2-piperidone, N-isopropyl-2-piperidone, N-methyl-6-methyl-2-piperidone, N-methyl-3-ethyl-2-piperidone, and the like.

The urea compound may include, for example, tetramethyl urea, N,N'-dimethylethylene urea, and N,N'-dimethylpropylene urea.

As the cyclic organophosphorus compound may be used, for example, an oxosulphorane such as 1-methyl-1-oxosulphorane, 1-ethyl-1-oxosulphorane or 1-phenyl-1-oxosulphorane, or an oxophosphorane such as 1-methyl-1-oxophosphorane, 1-n-propyl-1-oxophosphorane or 1-phenyl-1-oxophosphorane, or the like.

Among the organic polar solvents, the amide or lactam compounds may be conveniently used. Preferred are an N-alkyllactam and an N-alkylpyrrolidone. More preferred is N-methylpyrrolidone. The organic polar solvent may be used singly or in combination thereof.

In accordance with the present invention, the desired polyarylene sulfides may be produced by polymerization of the sodium hydrosulfide with the dihalogen aromatic compound in the presence of the alkali metal aminoalkanoate and the lithium halide in the organic polar solvent.

Rates of the reaction components to be used in this reaction will be described in more detail hereinafter.

The dihalogen aromatic compound may be used in an amount ranging generally from 0.90 to 1.3 moles, preferably from 0.95 to 1.2 moles, with respect to mole of the sodium hydrosulfide. If the amount is below the lower limit, by-products such as thiophenols may be produced. The use of the dihalogen aromatic compound in the amount exceeding the upper limit may reduce the molecular weight of the resulting polyarylene sulfides. It is to be noted, however, that an appropriate amount of the dihalogen aromatic compound may be selected depending upon the amount of the branching agent or upon the molecular weight or material properties of the resulting polyarylenesulfides.

The alkali metal aminoalkanoate may be used in an amount ranging generally from 0.30 to 3.0 moles, preferably from 0.95 to 1.5 moles, more preferably from 1.01 to 1.20 moles, with respect to mole of the sodium hydrosulfide. If the amount is below its lower limit, the resulting polyarylene sulfides may not reach their sufficient level of molecular weights. Even if the alkali metal aminoalkanoate would be used in an amount above its upper limit, the effect of using the alkali metal aminoalkanolate in that amount as an acid trapping agent cannot be increased. In particular, when the alkali metal aminoalkanoate is used in the amount ranging from 1.01 to 1.20 moles, the resulting polyarylene sulfides become so porous granular that their good cleansability and solid-to-solutionseparability using a mesh net can be attained.

The lithium halide may be used in an amount ranging generally from 0.05 to 2.0 moles, preferably from 0.2 to 1.5 moles, with respect to mole of the sodium hydrosulfide. The amount of the lithium halide in the amount below the lower limit may not achieve the effect of using the lithium halide, while its amount above the upper limit may not demonstrate the effect in accordance with the amount of the lithium halide.

The amount of the organic polar solvent is not restricted to a particular range as long as it is sufficient to proceed with the reaction in a homogeneous manner. It may be conveniently in the range from 1 to 20 moles with respect to mole of the sodium hydrosulfide. If the solvent is used in the amount below the lower limit, the reaction does not proceed to a sufficient extent. If the amount of the solvent exceeds the upper limit, a volume efficiency is worsened, thereby reducing productivity.

In accordance with the process of the present invention, various additives may be optionally added to the polymerization system. The additives may include, for example, a branching agent such as an active-hydrogen containing halogen aromatic compound, a polyhalogen aromatic compound containing more than two halogen atoms in its molecule, and a halogen aromatic nitro compound, a molecular weight modifier such as a monohalogen aromatic compound or an active-hydrogen containing compound, a reducing agent, an inert organic solvent, and so on.

As the active-hydrogen containing halogen aromatic compound as one of the branching agent may be employed a halogen aromatic compound with an active-hydrogen containing group or groups, such as an amino group, thiol group, hydroxyl group or the like. More specifically, the active-hydrogen containing halogen aromatic compound may include, for example, a dihaloaniline such as 2,6-dichloroaniline, 2,5-dichloroaniline, 2,4-dichloroaniline and 2,3-dichloroaniline, a trihaloaniline such as 2,3,4-trichloroaniline, 2,3,5- trichloroaniline, 2,4,6-trichloroaniline and 3,4,5-trichloroaniline, an amino-containing halogen aromatic compound including a dihaloaminodiphenyl ether such as 2,2'-diamino-4,4'-dichlorodiphenyl ether and 2,4'-diamino-2',4-dichlorodiphenyl ether, and a mixture thereof. One or more halogen atoms in the above compounds may be replaced by fluorine atom, bromine atom and so on in addition to chlorine atom. Furthermore, those in which the amino group is replaced by the other functional group such as the thiol group or the hydroxyl group may also be used. There may also be used an active-hydrogen containing halogen aromatic compound, in which a hydrogen atom or atoms joined to the carbon atom or atoms forming its aromatic ring is or are replaced by another inert group or groups such as a carbohydryl group, i.e., an alkyl group. Among the active-hydrogen containing halogen aromatic compounds, the active-hydrogen containing dihalogen aromatic compound is preferred. Dichloroaniline is more preferred.

The polyhalogen aromatic compound to be used as one of the branching agents may include, for example, a trihalobenzene such as 1,2,4-trichlorobenzene and 1,3,5-trichlorobenzene and a trihalonaphthalene such as 1,4,6-trichloronaphthalene. Particularly, 1,2,4-trichlorobenzene and 1,3,5-trichlorobenzene are preferred.

The halogen aromatic nitro compound may include, for example, a mono- or di-halonitrobenzene such as 2,4-dinitrochlorobenzene or 2,5-dichloronitrobenzene, a dihalonitrodiphenyl ether such as 2-nitro-4,4'-dichlorodiphenyl ether, a dihalonitrodiphenyl sulfone such as 3,3'-dinitro-4,4'-dichlorodiphenyl sulfone, a mono- or di-halonitropyridine such as 2,5-dichloro-3-nitropyridine or 2-chloro-3,5-di-nitropyridine, or a dihalonitronaphthalene.

In the polyhalogen aromatic compounds and the halogen aromatic nitro compounds, the halogen atom or atoms may be identical to or different from each other and may be chlorine, fluorine or bromine atom.

The use of the branching agent, such as the active-hydrogen containing halogen aromatic compound, the polyhalogen aromatic compound, and the halogen aromatic nitro compound may serve as increasing branches of the resulting polymer, thereby further enlarging a molecular weight thereof, thereby further improving various properties of the resulting polymer.

The amount of the branching agent may be in the range generally from 0.0005 to 0.05 mole, preferably from 0.001 to 0.02 mole, with respect to mole of the dihalogen aromatic compound.

The monohalogen aromatic compound to be added as a molecular weight modifier may include, for example, chlorobenzene, bromobenzene, α-bromobenzene, α-chlorotoluene, o-chlorotoluene, m-chlorotoluene, p-chlorotoluene, α-bromotoluene, o-bromotoluene, m-bromotoluene, and p-bromotoluene.

The active-hydrogen containing compound may include, for example, a thiophenol, phenol, aniline, and so on.

As the branching agent or molecular weight modifier, there may be used a compound having more than two reactive halogen atoms, such as cyanuric chloride.

The branching agent or molecular weight modifier may be used singly or in combination thereof.

The reducing agent may include, for example, a hydrazine, metal hydride, alkali metal formate, and sulfur. The metal hydride is preferred, as well as sodium borohydride and calcium hydride are more preferred.

The inert solvent may include, for example, a hydrocarbon such as benzene, toluene, xylene, biphenyl, terphenyl, naphthalene, or anthracene, an ether such as diphenyl ether, p-diphenoxybenzene, polyethylene glycol, or dioxane, or the like. A high-boiling-point inert organic solvent is preferred.

In accordance with the process of the present invention, the components including the dihalogen aromatic compound, the sodium hydrosulfide, the alkali metal aminoalkanoate, and the lithium halide may be added or contacted in any order to or in the organic polar solvent as long as they can be polymerized in the organic polar solvent.

A preferred feature is such that the dihalogen aromatic compound, the sodium hydrosulfide, the alkali metal aminoalkanoate and the lithium halide are brought into contact with each other in the organic polar solvent. In this instance, it is preferred that a hydrous mixture of the sodium hydrosulfide with the alkali metal aminoalkanoate is first dehydrated so as to reduce its water content to 1.5 mole or lower with respect to the sodium hydrosulfide and the resulting dehydrated material is then contacted with the lithium halide and the dihalogen aromatic compound. Dehydration may be carried out by means of distillation. Although it is preferred that the dehydration is carried out, for example, at a temperature of 150° to 202° C. in an inert gas, such as in a stream of nitrogen, the dehydration may be effected by heating under reduced pressures. A dehydrating agent such as calcium oxide or calcium chloride may be employed.

The polymerization may be carried out at a temperature ranging generally from 180° to 330° C., preferably from 210° to 290° C. Temperatures below the lower limit makes a reaction rate so slow that it is not practically applicable, while temperatures above the upper limit cause by-production and degrade or decompose the resulting polymer, thereby imparting a color or causing gellation.

Although a reaction time may vary with kinds and amounts of the various components or the acid seizing agents or with a reaction temperature, it may range generally within 20 hours, preferably from 0.1 to 8 hours.

The polymerization may be carried out in an ambient atmosphere of an inert gas such as nitrogen, argon or carbon dioxide.

A reaction pressure is not restricted to a particular range and may be generally up to 50 kg/cm$^2$ (absolute pressure) from the self pressure of the polymerization system such as the solvent. The polymerization may be a one-stage reaction in which the reaction is carried out at a stationary temperature or a multiple-stage reaction in which the reaction temperature is elevated in a stepwise manner or in a continuously ascending manner.

After completion of the polymerization, the resulting polyarylene sulfide may be isolated by separating it directly from a reactor by a standard method such as filtration or centrifugal separation or by separating it from the reaction mixture after addition of a flocculating agent such as water and/or a dilute acid.

The polymer separated is then washed usually with water, methanol, methylene chloride, chloroform, acetone, benzene, toluene, or the like, to remove the alkali metal hydrosulfide, lithium halide, solvent and the like adhering to the polymer. The resulting polymer may be effectively recovered by distilling off the solvent from the reaction mixture without separation of the polymer therefrom and by washing the residue in the same manner as have been described hereinabove. The solvent recovered may be reused.

It should be noted that the process according to the present invention can provide the polyarylene sulfides in a granular or porous granular form which are particularly preferred in terms of filtration separation, washing, and handling.

As have been described hereinabove, the process according to the present invention can readily produce the poyarylene sulfides such as polyphenylene sulfides, in the granular form, having a high molecular weight and a high degree of whiteness in high yields and with high efficiency and stability.

The amount of salts such as sodium chloride remaining in the polyarylene sulfides obtained by the process according to the present invention is remarkably smaller than that by the conventional process using the alkali metal sulfide as a source of sulfur, so that the polyarylene sulfides are superior in a resistance to moisture and an electric insulation. Accordingly, the polyarylene sulfides obtained by the process of the present invention can be molded and processed without desalting to molded articles to be appropriately used in the electric and electronic field. If necessary, they may be subjected to desalting treatment after washing in order to reduce a content of salts remaining in the polymer.

In molding the polyarylene sulfides obtained by the process according to the present invention, for example, other polymers, pigments, fillers such as graphite, metal powder, glass powder, quartz powder and glass fibers, stabilizers, and lubricants may be added.

The polyarylene sulfides according to the present invention may be used as matrix resins for various molded products and composite materials, and they can be molded into films, sheets, fibers, and various articles and items and can be conveniently used for mechanical, electrical and electronic parts and as IC sealants.

The present invention will be described by way of examples with reference to comparative examples.

EXAMPLE 1

Synthesis of Sodium N-Methyl Aminobutyrate

A 1-liter reactor was charged with 41.24 g (1.03 moles) of sodium hydroxide, 300 ml (3.12 moles) of N-methylpyrrolidone, and 48.6 g (2.7 moles) of purified water. This mixture was stirred under a nitrogen stream and heated to 118° C. over the period of 30 minutes. And the distilling of the mixture was started at this temperature, and the temperature was elevated to 186° C. at which a distillate in pale yellowish brown color was obtained in the amount of 52 ml in 65 minutes. It was found that the distillate contained 40 g of water. The content in the reactor was cooled to room temperature and the addition of 500 ml of benzene yielded a crude product in the form of a slurry. After the slurry was filtered, the residue was washed twice with 1,200 ml of benzene and then once with 1,200 ml of hexane. The product was dried in vacuo yielding sodium N-methyl aminobutyrate in the amount of 131 g. The sodium N-methyl aminobutyrate was identified by elementary analysis as follows:

| | C | H | N | Na |
|---|---|---|---|---|
| Calculated | 43.2% | 7.2% | 10.1% | 16.5% |

| | C | H | N | Na |
|---|---|---|---|---|
| Found | 42.6% | 7.1% | 10.2% | 16.8% |

The melting point of the sodium N-methyl aminobutyrate was found to be 204°–210° C.

Preparation of Polyphenylene Sulfide

A 1-liter autoclave was charged with 63.35 g (0.543 mole) of a sodium hydrosulfide (48% by weight) aqueous solution, 75.48 g (0.543 mole) of sodium N-methyl aminobutyrate, and 297 ml (3.09 moles) of N-methylpyrrolidone, and the mixture was stirred and heated to 202° C. under a nitrogen stream to distill off a mixture of N-methylpyrrolidone with water in the amount of 145 ml. Hydrogen sulfide in the distillate and in the decomposed gases in the gases was traped by a sodium hydroxide aqueous solution, and a decomposition rate of sodium hydrosulfide was quantitated by the following formula:

$$\text{Decomposition Ratio of Sodium (\%) of Hydrosulfide} = \frac{\text{Moles of Sulfur in Solution And Gases Distilled Off}}{\text{Moles of Sulfur in Sulfur Source Charged}} \times 100$$

The decomposition ratio of sodium hydrosulfide was found to be 0.1%.

After the remaining material was cooled to about 100° C., it was mixed with a solution obtained by dissolving 23.01 g (0.543 mole) of lithium chloride and 79.74 g (0.542 mole) of p-dichlorobenzene equivalent of the mole of the sodium hydrosulfide remaining in the autoclave in 103 of N-methylpyrrolidone, and the autoclave was closed and heated to 260° C. at which the polymerization was continued for 3 hours.

After completion of the reaction, the reaction mixture was cooled to room temperature and the product in a slurry form was taken out of the autoclave. After filtration, the solid product was separated and washed three times with 1 liter of water and then twice with 1 liter of acetone. The residue was then dried in vacuo at 100° C. for 20 hours yielding a polymer in a white color in the amount of 55.22 g (94%; based on p-dichlorobenzene). The polymer was measured for its inherent viscosity [$\eta_{inh}$] of 0.25 when measured in α-chloronaphthalene in the concentration of 0.4 g/dl at 206° C. The sodium ion in the polymer was quantitated by means of atomic absorption method and found to be contained in the amount of 108 ppm.

The amounts of the raw materials and measurement results with Melt Index are shown in Table below.

EXAMPLE 2

The procedures of Example 1 were followed with the exception that the amount of sodium N-methyl aminobutyrate was changed from 75.48 g (0.543 mole) to 82.99 g (0.597 mole). The amount of p-dichlorobenzene added was 79.74 g (0.542 mole). The yield of the polymer was 56.17 g (96%; based on p-dichlorobenzene).

This product was found to have an inherent viscosity [$\eta_{inh}$] of 0.31 when measured in α-chloronaphthalene at the concentration of 0.4 g/dl at the temperature of 206° C. It was further found that the amount of sodium ion was 80 ppm. The amounts of the raw materials and measurement results with Melt Index are shown in Table below.

EXAMPLE 3

The procedures of Example 1 were followed with the exception that the amount of lithium chloride was changed from 23.01 g (0.543 mole) to 11.51 g (0.272 mole), yielding 56.17 g (96%; based on p-dichlorobenzene) of polyphenylene sulfide. The amount of p-dichlorobenzene added was 79.74 g (0.542 mole).

This product was found to have an inherent viscosity [$\eta_{inh}$] of 0.21 when measured in α-chloronaphthalene at the concentration of 0.4 g/dl at the temperature of 206° C. The sodium ion in the polymer was found to be contained in the amount of 180 ppm by means of quantitation by the atomic absorption analysis. The amounts of the raw materials and measurement results with Melt Index are shown in Table below.

EXAMPLE 4

A 1-liter autoclave was charged with 25.15 g (0.597 mole; content, 95%) of sodium hydroxide, 26.4 g (1.47 mole) of purified water, and 297 ml (3.09 moles) of N-methylpyrrolidone, and the mixture was reacted at 180° C. for 1 hour after replenishment with nitrogen. After the reaction mixture was cooled to 100° C. or lower, 63.35 g (0.543 mole) of a sodium hydrosulfide aqueous solution (48% by weight) and the mixture was heated to 202° C. under a nitrogen stream, distilling off a mixture of N-methyl- pyrrolidone with water in the amount of 171 ml. Then the polymer was yielded in the amount of 55.71 g (95%; based on p-dichlorobenzene) in the same manner as in Example 2.

The polymer was found to have an inherent viscosity [$\eta_{inh}$] of 0.31 as measured in α-chloronaphthalene at the concentration of 0.4 g/dl at the temperature of 206° C. The sodium ion in the polymer was found to be contained in the amount of 85 ppm by quantitation by means of the atomic absorption analysis. The amounts of the raw materials and measurement results with Melt Index are shown in Table below.

COMPARATIVE EXAMPLE 1

The procedures of Example 1 were followed with the exception that no lithium chloride was used, yielding 45.73 g (78%; based on p-dichlorobenzene) of polyphenylene sulfide. This product was found to have an inherent viscosity [$\eta_{inh}$] of 0.12 as measured in the same manner as hereinabove.

The infrared absorption spectrum of the polymer revealed that it has spectra different from that of the polyphenylene sulfide obtained in Example 1 as follows:
1820 cm$^{-1}$ (carbonyl); 1700 cm$^{-1}$ (carbonyl);
890 cm$^{-1}$ (tri-substituted benzene); 660 cm$^{-1}$; and 600 cm$^{-1}$

EXAMPLE 5

The procedures of Example 4 were followed with the exception that 2,5-dichloronitrobenzene was added in the amount of 0.3% mole with respect to p-dichlorobenzene, yielding the polymer in the yield of 96%. The resulting polymer was found to have an inherent viscosity of 0.40 as measured in the same manner as described hereinbefore. The amounts of the raw materials and measurement results with Melt Index are shown in Table below.

EXAMPLE 6

The procedures of Example 4 were followed with the exception that 2,5-dichloronitrobenzene was added in the amount of 0.6% mole with respect to p-dichlorobenzene, yielding the polymer in the yield of 96%. The resulting polymer was found that it could not be measured because of its insolubility. The amounts of the raw materials and measurement results with Melt Index are shown in Table below.

EXAMPLE 7

The procedures of Example 4 were followed with the exception that 1,2,4-trichlorobenzene was added in the amount of 0.3% mole with respect to p-dichlorobenzene, yielding the polymer in the yield of 95%. The resulting polymer was found to have an inherent viscosity of 0.38 as measured in the same manner as described hereinbefore. The amounts of the raw materials and measurement results with Melt Index are shown in Table below.

COMPARATIVE EXAMPLE 2

The procedures of Example 1 were followed with the exception that 91.30 g (0.0543 mole) of sodium sulfide pentahydrate was used in place of the sodium hydrosulfide and the sodium N-methyl aminobutyrate, and 77.83 g (0.529 mole) of p-dichlorobenzene was added, yielding 47.49 g (83%; based on p-dichlorobenzene) of polyphenylene sulfide. This product was found to have an inherent viscosity [$\eta_{inh}$] of 0.26 when measured in the same manner as described hereinbefore. The sodium ion in the polymer was contained in the amount of 160 ppm when measured by means of the atomic absorption analysis. The amounts of the raw materials and measurement results with Melt Index are shown in Table below.

As will be apparent from the Table below, the process according to the present invention presents the advantages that decomposition ratio of the sulfur source as shown in Examples are smaller than the cases as shown in Comparative Examples 1 and 2 and the yields are improved to a remarkable extent.

It is further found that the polyarylene sulfides obtained by the process according to the present invention are lower in salt content and higher in molecular weight than those obtained in Comparative Examples 1 and 2.

More specifically, the process according to the present invention is superior to the conventional process in the fact that a decomposition of the sulfur source can be prevented during dehydration because the sodium hydrosulfide is used as a source of sulfur in the presence of the lithium halide and the alkali metal aminoalkanoate is used as an acid trapping agent. Accordingly, the process according to the present invention permits a production in high yields of the polyarylene sulfides having a small content of salts and having a high degree of whiteness and a high molecular weight. Furthermore, if an alkali metal aminoalkanoate is used in special fixed amount, the polyarylene sulfides become porous granular that their good washability and solid-to-solution separability. Whereby the process of this invention is extremely industrially useful.

TABLE

| Examples And Comparative Examples | AMOUNTS OF COMPONENTS (moles) | | | | | Decomposition Rate of Sodium hydrosulfide (%) | Total Yields (%) | Yields of Granular Product (%) (*1) | Content of Sodium Ion (ppm) | Intrinsic Viscosity [$\eta_{inh}$] (g/l) | Melt Index (g/10 min) (*2) |
|---|---|---|---|---|---|---|---|---|---|---|---|
| | Sodium Hydro-sulfide | Sodium N-methyl amino-butyrate | Lithium chloride | p-Di-chloro-benzene | Branching Agent | | | | | | |
| Example 1 | 0.543 | 0.543 | 0.543 | 0.542 | — | 0.1 | 94 | 88 | 108 | 0.25 | 150 |
| Example 2 | 0.543 | 0.597 | 0.543 | 0.542 | — | 0.1 | 96 | 89 | 80 | 0.31 | 73 |
| Example 3 | 0.543 | 0.543 | 0.272 | 0.542 | — | 0.1 | 96 | 78 | 180 | 0.21 | 550 |
| Example 4 | 0.543 | 0.597 | 0.543 | 0.542 | — | 0.1 | 95 | 90 | 85 | 0.31 | 80 |
| Example 5 | 0.543 | 0.597 | 0.543 | 0.542 | 0.0016 | 0.1 | 96 | 90 | 90 | 0.40 | 7.2 |
| Example 6 | 0.543 | 0.597 | 0.543 | 0.542 | 0.0036 | 0.1 | 96 | 91 | 100 | NM(*3) | 0 |
| Example 7 | 0.543 | 0.597 | 0.543 | 0.542 | 0.0016 | 0.1 | 95 | 89 | 95 | 0.38 | 10.5 |
| Comp. Ex. 1 | 0.543 | 0.543 | — | 0.542 | — | 0.1 | 78 | 0 | 2200 | 0.12 | >2000 |
| Comp. Ex. 2 | Sodium sulfide 0.543 | | 0.543 | 0.529 | — | 2.5 | 90 | 83 | 160 | 0.26 | 150 |

Notes:
(*1) residues from 60-mesh filter
(*2) 316° C.; 5 kg (ASTM 1238)
(*3) NM = Non-Measurable

What is claimed is:

1. A process for preparing a polyarylene sulfide, comprising reacting at least one dihalogen aromatic compound with a sulfur source consisting essentially of sodium hydrosulfide in the presence of an alkali metal aminoalkanoate and a lithium halide in an organic polar solvent.

2. A process as claimed in claim 1, wherein the dihalogen aromatic compound is selected from the group consisting of a p-dichlorobenzene and a mixture comprising 80 moles or more of p-dichlorobenzene with 20 moles or less of m-dichlorobenzene.

3. A process as claimed in claim 1, wherein the alkali metal aminoalkanoate is represented by the following formula:

$$R_1R_2N-(CR_3R_4)_n-COOM$$

wherein
$R_1$, $R_2$, $R_3$ and $R_4$ are identical to or different from each other and are each a hydrogen atom, an alkyl group having from 1 to 12 carbon atoms, a cycloalkyl group having from 3 to 12 carbon atoms, or an aryl group;
M is an alkali metal;
n is an integer from 1 to 12; and
provided that the total number of carbon atoms in said entire formula ranges from 2 to 24.

4. A process as claimed in claim 3, wherein the alkali metal M in said formula is lithium, sodium, potassium, rubidium or cesium.

5. A process as claimed in claim 3, wherein the alkali metal aminoalkanoate is an alkali metal salt of N-methyl aminobutyric acid, N-methyl aminovaleric acid or N-methyl aminocaproic acid.

6. A process as claimed in claim 1, wherein the lithium halide is lithium fluoride, lithium chloride, lithium bromide or lithium iodide.

7. A process as claimed in claim 1, wherein the organic polar solvent is at least one non-protonic organic solvent selected from the group consisting of an amide compound, a lactam compound, a urea compound and a cyclic organophosphorus compound.

8. A process as claimed in claim 1, further comprising reacting a branching agent selected from an active-hydrogen containing halogen aromatic compound, a polyhalogen aromatic compound containing more than two halogen atoms, or a halogen aromatic nitro compound.

9. A process as claimed in claim 1, wherein the dihalogen aromatic compound is reacted in an amount of from 0.90 to 1.3 moles per mole of the sodium hydrosulfide.

10. A process as claimed in claim 9, wherein the dihalogen aromatic compound is reacted in an amount of from 0.95 to 1.2 moles per mole of the sodium hydrosulfide.

11. A process as claimed in claim 1, wherein the alkali metal aminoalkanoate is present in an amount of from 0.30 mole to 3.0 moles per mole of the sodium hydrosulfide.

12. A process as claimed in claim 11, wherein the alkali metal aminoalkanoate is present in an amount of from 1.01 to 1.20 moles per mole of the sodium hydrosulfide.

13. A process as claimed in claim 1, wherein the lithium halide is present in an amount of at least 0.05 mole per mole of the sodium hydrosulfide.

14. A process as claimed in claim 1, wherein the organic polar solvent is present in an amount of from 1 to 20 moles per mole of the sodium hydrosulfide.

15. A process as claimed in claim 8, wherein the branching agent is reacted in an amount of from 0.0005 to 0.05 mole per mole of the sodium hydrosulfide.

16. A process for preparing a polyarylene sulfide, comprising:
the step of dehydrating a hydrous mixture of a sulfur source consisting essentially of sodium hydrosulfide and an alkali metal aminoalkanoate;
the step of adding a lithium halide and dihalogen aromatic compound to the resulting dehydrated material; and
the step of reacting the resulting mixture.

17. A process as claimed in claim 16, wherein the hydrous mixture is dehydrated to reduce water content to up to 1.5 moles per mole of the sodium hydrosulfide.

* * * * *